Jan. 22, 1957 E. H. BRADLEY 2,778,888

DISTRIBUTED AMPLIFIERS

Filed Dec. 30, 1952

INVENTOR
EMMETT H. BRADLEY

BY [signature]
ATTORNEY

2,778,888

DISTRIBUTED AMPLIFIERS

Emmett H. Bradley, Arlington, Va., assignor to Melpar, Inc., Alexandria, Va., a corporation of New York Application December 30, 1952, Serial No. 328,600
9 Claims. (Cl. 179—171)

The present invention relates generally to amplifiers, and more particularly to distributed amplifiers employing triode vacuum tubes as amplifying elements.

Distributed amplifiers, employing pentodes as amplifying elements, are well known and commercially available. Due to transit time and grid loading effects present in available pentodes, distributed amplifiers employing them have an apparent maximum upper cut-off at about 400 mc. It is known that triodes can be designed for high frequency operation, say to 1500 mc. and their use in distributed amplifiers might therefore be expected to result in an increase in the upper cut-off frequency of such amplifiers.

However, the conventional or known distributed amplifier operates, in accordance with the best opinion, only in virtue of the complete isolation of the input and output circuits thereof, and it is for this reason that it has always been the opinion of those skilled in the art that pentode amplifier tubes must be employed. It was expected, if triodes were employed as amplifying elements in distributed amplifiers, that the plate to grid capacities of the tubes, Cgp, would render the amplifiers unstable, and would introduce other harmful effects, by virtue of feedback from output line to input line through Cgp.

It therefore appeared that the use of triode tubes in distributed amplifiers was not feasible, unless some satisfactory means could be developed for decoupling between the grid and plate lines, or compensating for the existing coupling in some fashion, as by means of inverse coupling; but in view of the extremely wide bands of frequency to be amplified, say from D. C. to 1,000 mc., this seemed to be an impossibility.

I have, however, devised and constructed distributed amplifiers employing triodes as electronic amplifier elements, in which coupling between plate and grid circuits is eliminated or minimized, by employing pairs of tubes for each stage, the tubes of each stage being connected in paraphase, or in cascode. Thereby, the advantages of high frequency triodes are retained, in respect to attainment of amplification at higher frequencies, and the advantages of pentodes, in respect to isolation of effective grid and plate lines via inter-electrode coupling.

The use of triodes in distributed amplifiers, by minimizing grid loading and transit time effects, makes possible the design of amplifiers having three times the bandwidth of conventional distributed amplifiers employing pentodes. At the same time instability of the system is avoided, by the arrangement of the tube pairs of each section of the system, in cascode or paraphase connection.

Briefly described, the paraphase amplifier section includes two triode tubes having their cathodes at the same potential point, that point provided with a load with respect to ground. One of the tubes is driven, by a signal input connected from grid to ground, and the other tube has a grounded grid, so that it is driven by the voltage across the first mentioned load. Output signal may then be derived from a load in the anode circuit of the other tube. Similarly, of course, output signal is available across the load connected from cathode to ground. This load may be a resistance, in each stage, or it may be a transmission line. Since the driven tube of the system is connected as a cathode follower, and the remaining tube driven with grid grounded, the output in the plate circuit of the remaining tube is not phase inverted, which is advantageous for many applications. The fact that the driven tube is in a cathode follower circuit presents the advantage that the system can handle large input signals without distortion.

In the case of the cascode section of distributed amplification the anode of a first tube is connected directly to the cathode of a second tube, and via a resistance to ground. The cathode of the first tube is grounded, and the grid of the second tube is grounded, at least for A.-C. Input to the grid of the first tube is via a transmission line, and output is taken from the anode circuit of the second tube, wherein is provided a further transmission line. For the cathode to ground resistance of the second tube may be substituted a transmission line section of suitable impedance, and which incorporates the grid to cathode capacitance of the tube. The signals available at the output ends of the anode and input signal transmission lines are, respectively, of opposite phase, so that phase inverted outputs may be derived from the system.

It is, accordingly, a primary object of the present invention to provide a system of distributed amplification wherein triode tubes are employed as amplifier elements, and wherein these tubes are combined in pairs, in each section of the system, so that the input and output circuits of each section are mutually isolated.

It is a further object of the invention to provide a novel cascode distributed amplifier.

It is another object of the invention to provide a novel paraphase distributed amplifier.

The above and still further feature, objects and advantages of the invention will become evident upon consideration of the following detailed description of various embodiments thereof, especially when taken in conjunction with the accompanying drawings, wherein.

Figures 1, 2, 3, 4:
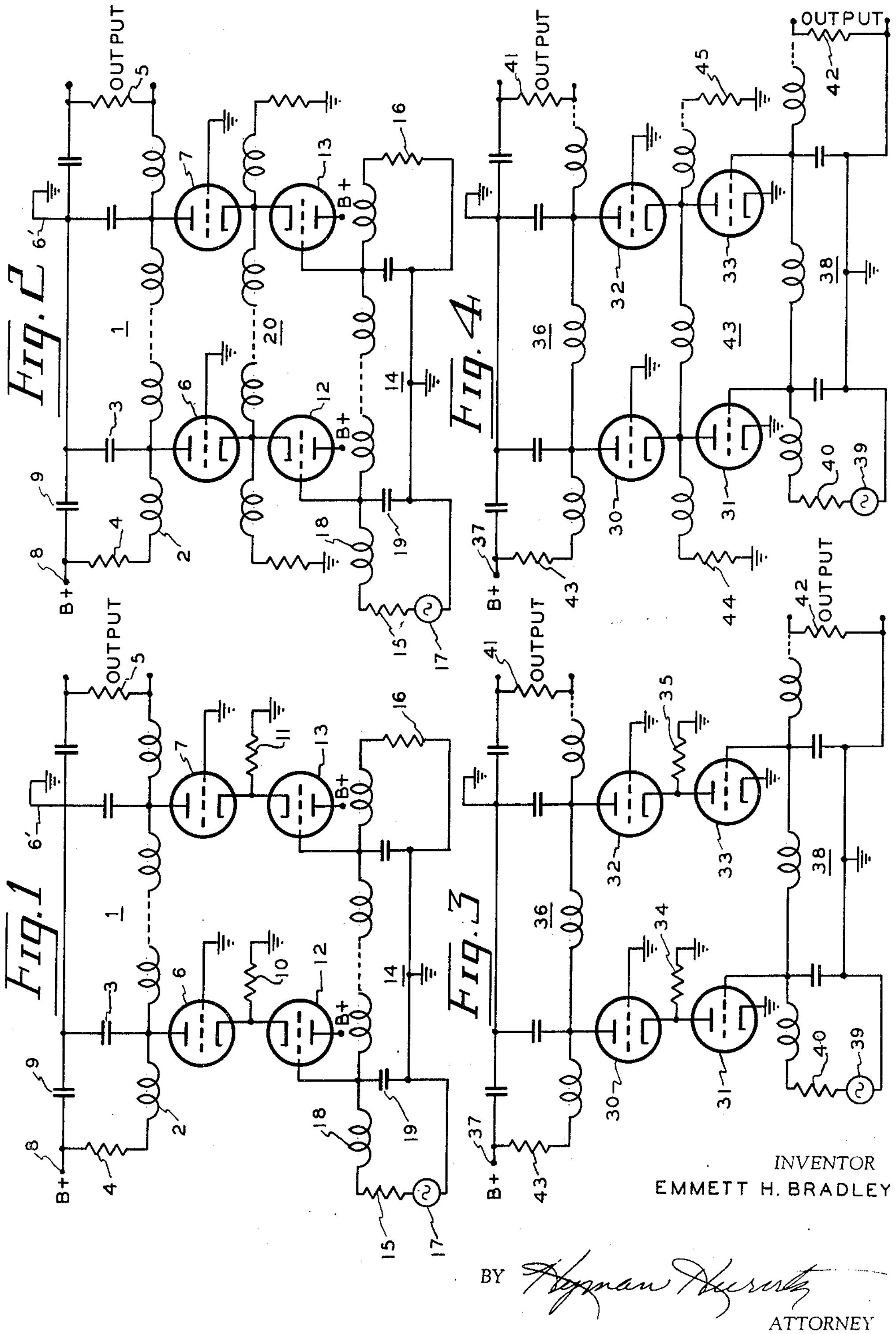
Figure 1 is a schematic circuit diagram of a two section stage paraphase distributed amplifier, arranged in accordance with the invention.
Figure 2 is a schematic circuit diagram of a modification of the system of Figure 1.
Figure 3 is a schematic circuit diagram of a cascode distributed amplifier.
Figure 4 is a schematic circuit diagram of a modification of the system of Figure 3.

Referring now more specifically to Figure 1 of the accompanying drawings, wherein is illustrated a paraphase distributed amplifier in schematic diagram form. The reference numeral 1 indicates generally a transmission line made up of lumped or distributed circuit elements, and generally comprising series inductance, as 2, and shunt capacity, as 3. The line 1 is terminated at each end by a resistance having a value equal to the characteristic impedance of the line. The reverse termination is a resistance identified by the reference numeral 4, and the output resistance by the reference numeral 5. One side of the line is grounded as at 6', and along the remaining side is distributed a plurality of triode vacuum tubes as 6, 7, the anodes of these tubes being directly connected to the line 1 at appropriate points thereof. A source of B+ voltage is connected to a terminal 8, which is isolated from ground by means of an isolating condenser 9, and which is accordingly connected to the anodes of the vacuum tubes 6, 7, via input resistance 4, and a portion of transmission line 1. The transmission line presents to the anode of the tubes, 6, 7, an output impedance, having at each point along the line the same value, i. e. the characteristic impedance of the line, and as is well known this impedance may be a resistance. The terminating resistance 5 for the line 1 may then be utilized as an output load resistance.

While I have illustrated the system of Figure 2 as employing two sections, it will be realized that a large number of sections may be employed if desired. It is usual and conventional practice to employ a number of sections greater than two in a stage of a distributed amplifier. The principles of the invention will however become evident upon consideration of the simplified system of Figure 1, and accordingly more elaborate systems are not illustrated or described.

The control electrodes or grids of the tubes 6, 7, are grounded, at least for A. C., and the cathodes are connected respectively via resistances 10, 11, to ground. Accordingly, the tubes 6, 7, operate as grounded grid triode amplifiers, as will appear further as the description proceeds. Voltage is developed across cathode resistors 10, 11, for driving the amplifier tubes 6. 7.

In paraphase relation with the tube 6 is a further tube 12, having its cathode directly connected to the cathode of the tube 6. Similarly a tube 13 is provided having its cathode directly connected to the cathode of the tube 7. The anodes of the tubes 12, 13, are connected directly to B+ voltage source, and the grids are brought down to spaced points along a transmission line, generally indicated by the reference numeral 14. The transmission line 14 is terminated at its input end and output end by resistances 15, 16, each of which has a value equal to the characteristic impedance of the line, and in series with the resistance 15 is provided a source of input signal 17. One side of the transmission line 14 is grounded, or constituted of a grounded conductor, and the other side consists of series connected inductances, as 18, from which shunt condensers, as 19, are connected to ground.

The two transmission lines 1 and 14 are matched in respect to phase propagation constant, so that phase velocity will be identical along both lines, and the tube pairs, as 6, 12, or 7, 13, are connected across points of equal phase delay on the two lines. The grounded grids of the tubes 6, 7, serve to shield the plate line 1 with respect to the input line 14, at least in respect to tube inter-electrode capacity, and to isolate the input circuit electrically from the output circuit, so that no feedback occurs through the tube capacities. For this reason the system is extremely stable as an amplifier. Since triodes are employed, a far wider range of frequencies may be amplified than is true of the conventional type of distributed amplifier, which employs tetrodes.

The system of Figure 2 is identical with the system of Figure 1 except in that the cathode resistors 10, 11 of Figure 1 have been replaced by a transmission line, generally indicated by the reference numeral 20. This transmission line is terminated, as is usual, in its characteristic impedance at both ends thereof. The transmission line 20 is so designed as to incorporate therein the grid to cathode capacitances of the tubes 6, 7.

It has been found that utilization of the transmission line system in Figure 2, in place of the cathode resistors 10, 11, as suggested in Figure 1, of the drawings, results in an increase in frequency response of the system. It will be clear from the general theory of distributed amplifiers that the phase propagation constant of the transmission line 20 must match that of the transmission line 1 and 14. The designs of the lines 1 and 14, as is conventional in the design of distributed amplifiers, must be such that the capacities of the associated tubes are incorporated in the lines and so incorporated that reflections do not occur by reason of the incorporation. In this respect the line 1 incorporates the anode to grid capacitances of the tubes 6, 7, while the transmission line 14 incorporates the grid to anode capacities of the tubes 12, 13, and in addition certain effective input capacities of the tubes, since the cathodes of the tubes 12, 13, eventually are connected to ground, as is one side of transmission line 14. Accordingly the transmission line 14 must be designed to take account not only of the grid to anode capacities of tubes 12, 13, but also of the impedance between grid and ground of these tubes, that impedance being a complex impedance, composed in part of tube capacity, and in part of grid loading resistance, and in part of virtual impedance due to the presence of signal in the cathode circuit.

The transmission line 20 is so designed as to incorporate the grid to cathode capacities of the tubes 6, 7, and in addition impedances due to the grid-cathode capacities of the tubes 12, 13 and the input loadings of the tubes 12, 13.

Since the systems of Figures 1 and 2 utilize triodes, they are capable of relatively wide band operation, and generally of operation at approximately three times the band width capable of attainment when pentodes are used. The problem of coupling between grid and plate lines, in triode tubes, is avoided by use of a combination of tubes, thereby eliminating the possibility of instability in the systems. The input tubes of the paraphase system behaves like cathode follower tubes, and amplification is provided by the system without phase inversion. Also, the system is capable of operation in response to maximum input signals equal in amplitude approximately to three times those employable in conventional types of distributed amplifiers.

In the systems of Figures 3 and 4, the cascode type of tube connection is employed, Figure 3 paralleling Figure 1 in that two transmission lines are employed, while Figure 4 parallels Figure 2 in that three transmission lines are employed.

In ditributed amplifiers employing the cascode type of tube connection, each section of a stage comprises two tubes connected in series with a source of voltage, i. e. the cathode of one tube is directly connected to the anode of the other tube of each section. If, then, the grid of the second tube is used as a signal input grid, and the grid of the first tube is grounded, at least for A. C., and its anode circuit used as an output, the input and output lines will be adequately isolated, and at the same time the use of triode tubes be permissible.

Two sections of an amplifier stage are illustrated in Figure 3. The first section comprises two triodes, 30 and 31, connected in series, i. e. with the cathode of the tube 30 directly connected to the anode of the tube 31. The second section includes two tubes 32 and 33 in series, i. e. with the cathode of the tube 33 directly connected to the anode of the tube 33. Cathodes of the tubes 31 and 33 are grounded, while the cathodes of the tubes 30 and 32 are connected to ground through load resistors 34 and 35, respectively. The anodes of the tubes 30 and 32 are connected to distributed points along the transmission line 36, and supplied with anode voltage from a terminal 37 through the transmission line 36. Accordingly, the transmission line 36 represents anode for the tubes 30 and 32. The control electrodes of the tubes 31 and 33 are connected to a further transmission line 38, at points therealong corresponding in respect to phase, with the points of connection of the anodes of the tubes 30, 32. In the usual fashion for distributed amplifiers the phase propagation constants of the lines 36 and 38 are made equal. The line 38 is so designed as to incorporate the grid to cathode capacities of the tubes 31, 33, while the transmission line 36 is so designed as to incorporate the plate to grid capacities of the tubes 30, 32.

In the system of Figure 3 a source of input signal 39 is connected in series with one end of the transmission line 38 through a resistance 40, equal in magnitude to the characteristic impedance of the line 38. The lines 36 and 38 are both terminated in their characteristic impedances, 41, 42, respectively, and the reverse side of the line 36 is provided with a load resistance 43, equal to the characteristic impedance of that line, the load resistance 43 being interposed between the B+ terminal 37 and the anodes of the tubes 30, 32.

In considering the operation of the system any section may be taken as typical. Considering tubes 30, 31, it will be evident that tube 31 is driven between its grid and cathode by the voltage developed across the transmission line 38, and since this has the net effect of varying the internal impedance of tube 31, the voltage division of the available supply, as between tubes 30 and 31, will vary, and the point 44 at the junction between the cathode of tube 30 and the anode of 31 correspondingly vary. This results in flow of alternating current in the resistance 34, or a varying voltage thereacross. This varying voltage is communicated to the input circuit of the tube 30, since the resistance 34 is connected between the cathode and control electrode of the tube. Thereby the tube 30 is varied in respect to internal resistance and variations of current occur in the output circuit of the tube which are communicated to the output resistor 41. Signal output voltage will also appear at the resistor 42, and be available as an output signal if desired. The output at the resistance 42 will obviously be in phase with the input signal. On the other hand the output across resistance 41 will be of opposite phase. The system of Figure 3 may accordingly be utilized as a phase inverter if desired, or outputs may selectively be derived from resistances 41, 42, in accordance with the phase of output which may be desired for a given application.

The system of Figure 4 is similar to that of Figure 3, and accordingly, the same numerals of reference have been applied to corresponding parts in these figures. The system of Figure 4 contains a transmission line in place of the resistances 34, 35, of Figure 3, being a duplicate circuit otherwise. It has been found that the incorporation of this transmission line serves to increase the frequency response which may be expected of amplifiers of this type, at the cost of some increase of complexity. It will be evident that the supplementary transmission line denominated 43, and having distributed points therealong which are connected to the cathode anode junctions of the various tube pairs of the amplifiers, may be terminated in its characteristic impedance at both ends, i. e. by resistances 44 and 45 for its input and output ends, respectively. The transmission line 43 must be designed to have the same phase propagation constant as have the other transmission lines 36, 38 of the system, and must be so designed as to incorporate the grid to cathode capacities of the tubes 30, 32, as well as the anode to cathode capacities of the tubes 31, 33.

The cascode connection of triode tubes in a distributed amplifier enables minimization of the effects of grid loading and transit time effects, which have heretofore effectively set the upper limit of frequency response in distributed amplifiers, by making feasible the use of triodes in such amplifiers. In practical amplifiers which I have designed and constructed I have found that the use of cascode circuits incorporating triode tubes of the high frequency type make it possible to obtain an increase of bandwidth of the order of three times, over that possible by utilizing pentode tubes in conventional distributed amplifiers. The use of cascode circuits enables elimination of the problem of avoiding coupling between grid and plate lines, and accordingly produces a stable amplifier system. The circuit has further importance in that it permits phase inversion, or in the alternative a phase of output selectively zero degrees, and 180 degrees, with respect to the phase of input signal.

While I have described and illustrated various specific embodiments of my invention, it will be evident to those skilled in the pertinent art that variations of the general arrangement may be resorted to without departing from the true spirit and scope of the invention as defined in the appended claims.

I claim:

1. In a distributed amplifier, a first phase delay transmission line, a second phase delay transmission line, means terminating each of said transmission lines in its characteristic impedance, a plurality of vacuum amplifier tube pairs, each of said tubes having an anode, a cathode and a control electrode and being of a type wherein sufficient capacitive feed-back exists between anode and grid to involve problems of unstable operation when employed for amplification at ultra high frequencies, means connecting the anodes of the first tubes of each pair to distributed points along said first transmission line, means connecting the control electrode of each of said first tubes to a point of fixed A. C. reference potential, and a load impedance connecting the cathode of each of said first tubes to said point of fixed reference potential, means connecting the control electrode of each of said second tubes to like distributed points along said second transmission line, means connecting one of the remaining electrodes of each of said second tubes to said point of reference potential, and means connecting the other of the remaining electrode of each of said second tubes to the cathode of the other tube of its pair, means for applying input signal to one of said transmission lines, means for deriving output signal from at least one of said transmission lines, and means for applying positive anode potential to the anodes of said first tubes via said first transmission line.

2. The combination in accordance with claim 1 wherein said one of the remaining electrodes is the cathode electrode.

3. The combination in accordance with claim 1 wherein said load impedance is a transmission line.

4. In a distributed amplifier, a first transmission line having substantial phase delay therealong, a second transmission line having substantial phase delay therealong, a plurality of tube pairs, each of said tubes having at least an anode, a control grid and a cathode, and being of a type wherein sufficient capacitive feed-back exists between anode and grid to involve problems of unstable operation when employed for amplification at ultra high frequencies, each pair connected in seriatim, means for connecting said tube pairs between said lines, each pair respectively to a pair of points of corresponding phase delay along said transmission lines, and with one of said transmission lines as an input line and the other as an output line, means for energizing said tubes, means for applying input signal to said tubes via the one of said lines, and means for deriving amplified output signal from at least one of said lines.

5. The combination in accordance with claim 4 wherein said each of tube pairs connected in seriatim are connected in cascode relation.

6. The combination in accordance with claim 4 wherein said tube pairs connected in seriatim are connected in paraphase relation.

7. In a distributed amplifier, an anode phase delay transmission line, a plurality of first triodes, having each an anode, a control electrode and a cathode, means connecting said anodes to distributed points along said transmission line, means grounding said control electrodes for A. C., and means connecting said cathode electrodes each to ground via an impedance, an input transmission line, a plurality of second triodes, each having a plate, a cathode and grid, and corresponding one for one with said first triodes to form paired triodes, means connecting the grids of said second triodes to said input transmission lines, at phase corresponding distributed points therealong, and means connecting the plate-cathode circuits of each of said second triodes across the impedance directly associated with the triode paired therewith.

8. The combination in accordance with claim 7 wherein the cathodes of said second triodes are all grounded.

9. The combination in accordance with claim 7 wherein the anodes of said second triodes are all grounded for A.-C.

References Cited in the file of this patent

UNITED STATES PATENTS 2,428,295 Scantlebury ------------ Sept. 30, 1947

OTHER REFERENCES

Article, "Tube At Work," by Zeluff, Electronics, March 1950, page 116.